Sept. 8, 1931.     E. W. JOHNSON     1,822,593
CREAM COOLER
Filed April 9, 1928     2 Sheets-Sheet 1
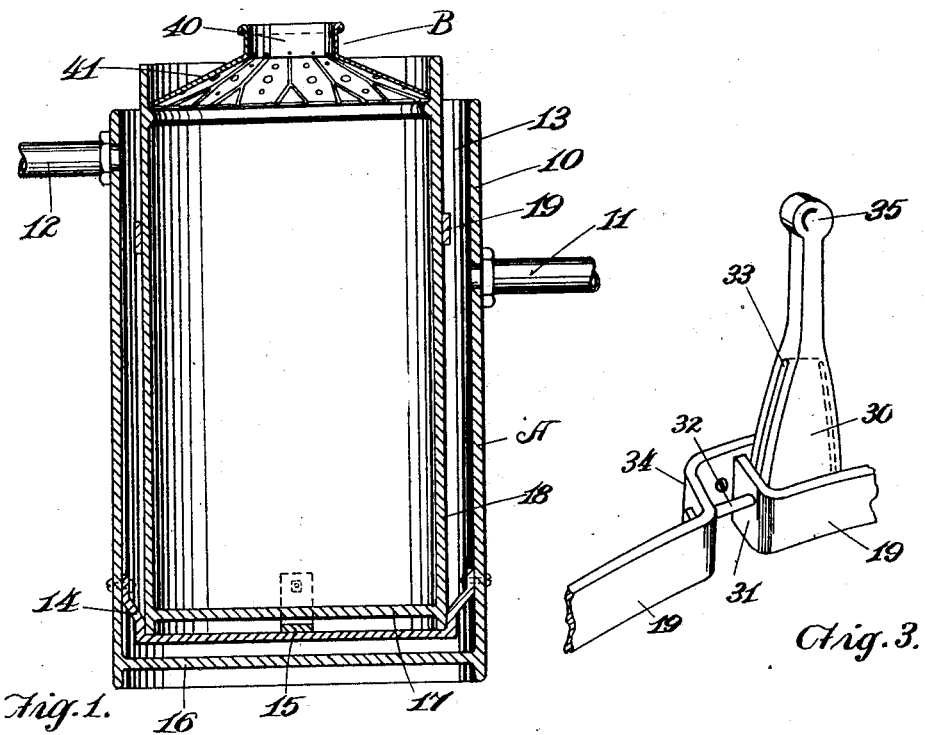
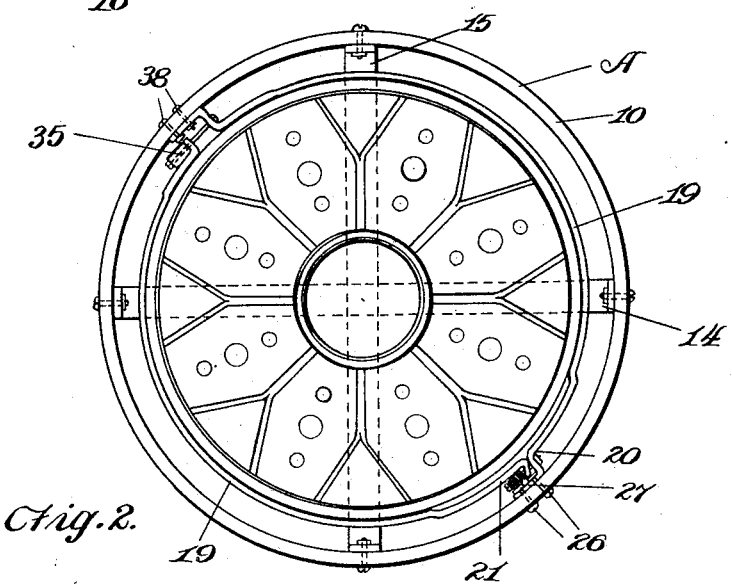
Inventor
Ellsworth W. Johnson
By Howard Puscher
Attorney Sept. 8, 1931.   E. W. JOHNSON   1,822,593
CREAM COOLER
Filed April 9, 1928   2 Sheets-Sheet 2

Inventor
Ellsworth W. Johnson

By Howard Fischer
Attorney

Patented Sept. 8, 1931

1,822,593

UNITED STATES PATENT OFFICE

ELLSWORTH W. JOHNSON, OF HECTOR, MINNESOTA, ASSIGNOR TO MIDWEST MOTOR SUPPLY, OF HECTOR, MINNESOTA, A FIRM

CREAM COOLER

Application filed April 9, 1928. Serial No. 268,497.

My invention relates to a cream cooler having a nature to cool the cream as it runs from the separator. In handling cream it is very desirable to cool the same down to a low temperature just as soon after it has been received from the milking as possible, and by my cooler the cream can be reduced to a very low and practical temperature directly as it runs from the separator, providing a very desirable means for handling cream and preserving the sweetness thereof.

My invention includes a cooler of a simple nature adapted to hold the cooling can within a cooler pail wherein cold water may be introduced and caused to flow through the same if desired, so as to keep the cooling can immersed within the cooling casing and thereby provide a cooler of a very efficient nature.

It is also an object of my invention to provide a spreader for the top of the cooler which functions to spread the cream out and cause it to run down the sides of the cooling can container, which being immersed in the cooling casing, so that cold water or other cold liquid or means entirely surrounds the cream cooling container, thereby directing the cream in thin spread-out streams over the surface of the cream container and rapidly cooling the same by directing the warm cream closely to the cooling medium surrounding the cream container. The spreader means includes a cup member from which a series of passageways spread the cream over a frustro-conical cover member which is formed with a series of radiating channels having bifurcated lower ends which discharge the cream in thin streams off of the periphery of the cover or spreader over the wall of the cream can directly adjacent the surrounding cooling medium.

Another object of my invention is to provide a means of holding the cream can within the cooling receptacle which forms the outer casing of my cooler.

These features, together with other objects and details of my cream cooler will be more fully hereinafter described.

In the drawings forming part of my specification:

Figure 1 is a side sectional illustration of my cream cooler.

Figure 2 is a plan view of the same.

Figure 3 is an enlarged perspective detail of a portion of the clamping ring.

Figure 4:
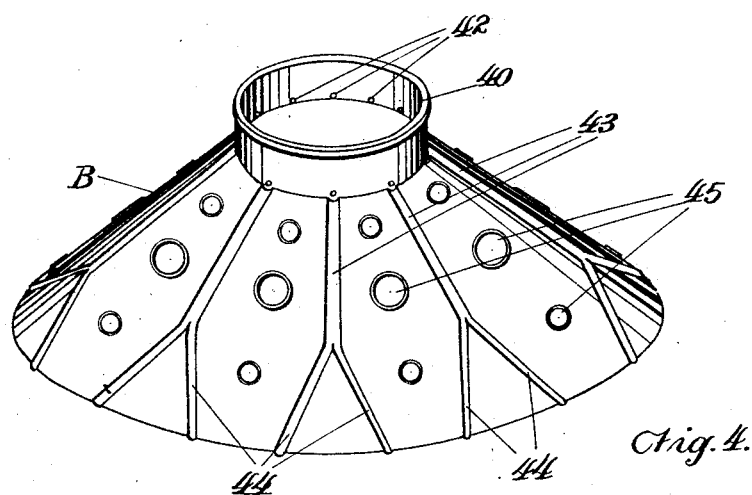
Figure 4 is a perspective view of the spreader cover for my cooler.
Figures 5, 6:
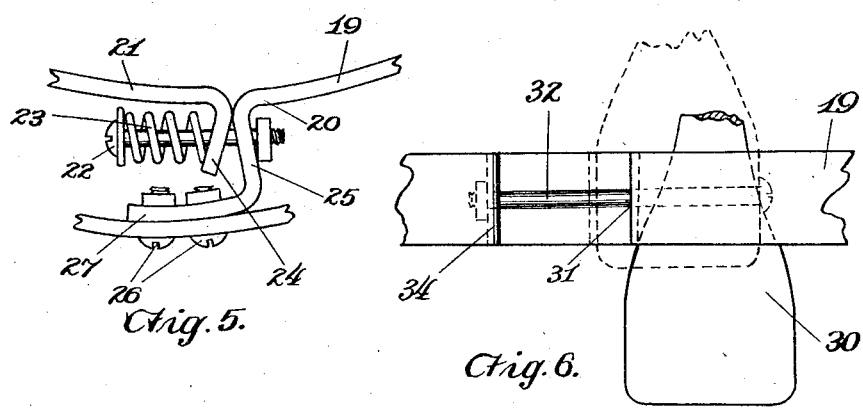
Figure 5 is an enlarged detail of the clamping ring.
Figure 6 illustrates an enlarged detail of the clamping ring.

My cooler A is provided with an outer receptacle and casing 10 which is adapted to receive water through the inlet pipe 11 and permit the discharge of the water out through the outlet pipe 12. This provides a receptacle 10 for introducing ice cold water into the chamber 13 of my cooler A.

The casing A is formed with spacer members 14 and 15 which are secured in the bottom of the casing 10 and are spaced from the bottom 16 of the same in a manner to support the bottom 17 of the cream can 18 away from the bottom 16 of the casing 10. The cream can 18 is adapted to receive the cream from the separator and is held within the casing 10 by the clamping ring 19.

The clamping ring 19 is of a particular formation having the ends 20 and 21 connected together by the bolt 22. A coil spring 23 presses against the hook end 24 and causes it to bear against the offset portion 25 of the end 20. The end 20 is connected to the casing 10 by the bolts 26 which pass through the end 27 of the same to connect the clamping ring adjacent the ends 20 and 21 to the casing 10 of my cooler A.

The end 24 is bent so that when the spring 23 operates it causes the sides of the ring 19 to expand. Virtually diametrically opposite to the ends 20 and 21 of the ring 19 I provide a clamping cam 30 which bears against the offset portion 31 of one side of the ring 19 and which is held by the bolt 32 which extends through the slot 33 formed in the cam member 30. The bolt 32 engages the offset portion 34 of the other side of the ring 19 so that when the cam 30 is engaged by its handle portion 35 and pulled upward against the offset portion 31, the portions 31 and 34 will be drawn toward each other as illustrated in Figure 3, clamping the sides of the ring 19 against the action of the spring 23 about the upper end of the cream can 18 to hold the cream can with its bottom portion in the cradle formed by the cross members 14 and 15. This holds the cream can clamped firmly in the casing 10 and in the cooling chamber 13 so that when cooling liquid is introduced into the same the can will not float even if it is empty. One of the portions of the ring 19 at the operating cam 30 is connected by the bolts 38 to the side of the casing 10 and thereby holds the side of the clamping ring 19 at the operating cam 30 rigidly to the casing in the same manner as the bolts 26 hold the other side of the clamping ring 19.

My cooler A is provided with a spreader B which is formed with a cup 40 from which depends a frusto-conical cover spreading portion 41. The cup 40 is formed with a series of outlet openings 42 which direct the cream from the cup 40 out to the radially extending channels 43 which are formed in the surface of the frustro-conical portion 41, and these channels 43 are bifurcated into smaller end channels 44 which cause the cream to run off at the periphery of the cover and spreader B. The cover B is formed with a series of air openings which may be of any size or number such as 45 so as to permit the air from the cream can 18 to pass out of the same as the cream runs into the can from the cup 40.

Thus in operation of my cream cooler the cream runs from the discharge pipe of a separator directly into the receiving cup 40, and then the cream is spread out through the openings 42 into the radial channels 43 which bifurcate out into the portions 44 and thereby direct the flow of the warm cream against the cold side wall of the cream can 18 which is surrounded by cold water or other cooling liquid, and I thereby cool the cream so rapidly as it leaves the cream separator as to provide a very efficient cooling means which operates automatically without extra attention and permits the cooling of the cream in an efficient manner, so that the cream is reduced to the proper temperature to assist in keeping it sweet and desirable to be stored away until it is taken to the market.

My cooler is of a simple nature and therefore may be sold at a reasonable price to the farmer, assisting him in cooling his cream and in such a simple efficient manner as to make my cooler virtually indispensable to the farmer, for the reason that he can market his cream sweet rather than having it sour, and the fact that sweet cream is much to be preferred, readily sets forth the primary importance of my cream cooler and the value of the same to the farmer and to the creameries.

All of the parts of my cooler are readily separable so that they can be sterilized, particularly those parts which the cream comes in contact with, and therefore the efficiency and practicability of my cooler is more clearly set forth.

In accordance with the patent statutes I have described the principles of operation of my cooler and while I have illustrated a particular formation and arrangement of the parts, I desire to have it understood that the same are only suggestive of a means of carrying out my invention and that changes and variations may be made within the scope of the following claims without departing from the spirit of my invention.

I claim:

1. A cream cooler including, a cream receiving receptacle, a cooling casing having a cradle and a clamping ring therein for supporting said receptacle virtually contained therein, means for directing a cooling medium about said cream receptacle, and a cream spreader cover for said receptacle.

2. A cream cooler including, a cream receiving can, a cream spreader cover, a cup formed in said cover, openings extending out of said cup, a conical cover portion projecting from said cup, radially extending grooves formed in a manner to receive the cream from the said cup out of said openings therein, and to spread the cream over said cover and to direct the same in thin streams along the cold wall of the cream receptacle.

3. A cream cooler comprising, a cream receptacle, a cover cream spreader for said receptacle having a cup formed thereon, openings in said cup associated with grooves formed on said cover to direct thin streams of cream over the peripheral edge of said cover along the cold wall of the cream receptacle, and means surrounding the cream receptacle for cooling the same.

4. A cream cooler including, a cream receptacle, a cooler receptacle, means in said cooler receptacle for holding said cream receptacle in a manner to permit a cooling medium to be passed around and under said cream receptacle, and a spreader cover for said cream receptacle having grooves each divided into a multiplicity of grooves adapted to direct cream over the peripheral edge thereof in thin streams and along the side walls of the cream receptacle.

5. A cream cooler comprising, a cooling receptacle adapted to permit a cooling medium to pass in and out of said receptacle, a cradle formed in the bottom of said receptacle, a clamping ring near the top of said receptacle, a cream receptacle adapted to be held by said cradle and said clamping ring to provide a space thereabout for the cooling medium, and adapted to support a cream spreading cover for said cream receptacle, and means for contracting said clamping ring.

6. A cream spreader for a cooling receptacle including, a cover member, a cup portion formed in said cover member, a conical depending portion extending from said cover, a series of openings in said cup, and a series of channel shaped grooves formed in said conical portion to spread cream from said cup to the peripheral edge of said cover.

7. A cream cooler including, a cream receptacle, a grooved spreading cover for said receptacle, the grooves in said cover each being divided into a multiplicity of grooves, and a casing member for directing a cooling medium about said cream receptacle including means for holding said cream receptacle clamped therein.

ELLSWORTH W. JOHNSON.